(12) United States Patent
Stein et al.

(10) Patent No.: US 8,870,229 B2
(45) Date of Patent: Oct. 28, 2014

(54) SYSTEM FOR CONNECTING HOSE LINES

(75) Inventors: Joachim Stein, Friedberg (DE); Olaf Dehnert, Soest (DE); Gunther Daniel, Friedberg (DE)

(73) Assignee: ContiTech Techno-Chemie GmbH, Karben (DE)

( * ) Notice: Subject to any disclaimer, the term of this patent is extended or adjusted under 35 U.S.C. 154(b) by 0 days.

(21) Appl. No.: 13/462,264

(22) Filed: May 2, 2012

(65) Prior Publication Data

US 2012/0255163 A1 Oct. 11, 2012

Related U.S. Application Data

(63) Continuation of application No. PCT/EP2010/063269, filed on Sep. 10, 2010.

(30) Foreign Application Priority Data

Nov. 3, 2009 (DE) .......................... 10 2009 044 404

(51) Int. Cl.
  *F16L 53/00* (2006.01)
(52) U.S. Cl.
  CPC ........... *F16L 53/008* (2013.01); *F01N 2610/02* (2013.01); *F01N 2610/10* (2013.01); *F01N 2610/14* (2013.01)
  USPC .............................. 285/41; 392/479; 219/544
(58) Field of Classification Search
  USPC ............. 285/21.2, 41; 392/479; 219/539, 544
  See application file for complete search history.

(56) References Cited

U.S. PATENT DOCUMENTS

| | | | | |
|---|---|---|---|---|
| 1,674,488 A | * | 6/1928 | Tang | 219/535 |
| 1,864,666 A | * | 6/1932 | Osborne | 285/41 |
| 2,470,854 A | * | 5/1949 | Kovac | 285/41 |
| 3,519,023 A | * | 7/1970 | Burns, Sr. et al. | 219/535 |
| 4,281,238 A | * | 7/1981 | Noma et al. | 219/544 |
| 4,329,569 A | * | 5/1982 | Hjortsberg et al. | 219/535 |
| 4,629,216 A | * | 12/1986 | Pedersen | 285/21.2 |
| 5,124,533 A | * | 6/1992 | Dommer et al. | 285/41 |
| 5,252,810 A | * | 10/1993 | Trosch et al. | 285/21.2 |
| 5,359,179 A | * | 10/1994 | Desloge et al. | 219/544 |

(Continued)

FOREIGN PATENT DOCUMENTS

| | | |
|---|---|---|
| DE | 35 44 589 A1 | 6/1987 |
| DE | 10 2005 050 867 A1 | 4/2007 |

(Continued)

OTHER PUBLICATIONS

International Search Report dated Dec. 21, 2010 of international application PCT/EP 2010/063269 on which this application is based.

*Primary Examiner* — David E Bochna
(74) *Attorney, Agent, or Firm* — Walter Ottesen P.A.

(57) ABSTRACT

A system for connecting hose lines, including a plug-in connector (2) and an electric heating element (36), wherein the plug-in connector (2) has at least one first (4) and one second connection (6) which are connected to one another by a tube (8), and wherein at least one section of the tube (8) can be heated by the electric heating element (36). The electric heating element (36) is embedded into a clamping ring (10) having a gap (12). The tube (8) is pushed through the gap (12) of the clamping ring (10) in such a way that the clamping ring (10) reaches around at least one section of the tube (8) and bears against the tube (8).

18 Claims, 4 Drawing Sheets

(56) References Cited

U.S. PATENT DOCUMENTS

| | | | |
|---|---|---|---|
| 5,667,712 A * | 9/1997 | Sutorius et al. | 219/544 |
| 5,714,738 A * | 2/1998 | Hauschulz et al. | 219/544 |
| 7,919,733 B2 * | 4/2011 | Ellis et al. | 219/544 |
| 2003/0099469 A1 | 5/2003 | Bakke | |
| 2010/0290764 A1 | 11/2010 | Borgmeier et al. | |
| 2011/0006513 A1 | 1/2011 | Lechner et al. | |
| 2011/0248494 A1 | 10/2011 | Rosenfeldt et al. | |

FOREIGN PATENT DOCUMENTS

| | | |
|---|---|---|
| DE | 10 2007 016 789 A1 | 10/2008 |
| DE | 10 2008 016 175 A1 | 5/2009 |
| JP | 11-159685 A | 6/1999 |

\* cited by examiner

SYSTEM FOR CONNECTING HOSE LINES

CROSS REFERENCE TO RELATED APPLICATIONS

This application is a continuation application of international patent application PCT/EP 2010/063269, filed Sep. 10, 2010, designating the United States and claiming priority from German application 10 2009 044 404.1, filed Nov. 3, 2009, and the entire content of both applications is incorporated herein by reference.

FIELD OF THE INVENTION

The invention relates to a system for connecting hose lines, consisting of a plug-in connector and an electric heating element, wherein the plug-in connector has at least one first and one second connector, which are connected to one another by a tube, and wherein at least one section of the tube can be heated by the electric heating element. With the aid of a plug-in connector of this kind, it is possible to connect either a plurality of hose lines or one hose line to a unit (for example, a pump et cetera) or one hose line to a liquid tank in a line system.

BACKGROUND OF THE INVENTION

Systems of the type stated at the outset are already known from the prior art and are used in line systems, the lines of which carry liquids which may freeze at low ambient temperatures. In a line system of this kind, it is customary to heat the individual hose lines and the plug-in connectors to prevent the liquid carried in the hose lines from freezing. Line systems with heated hose lines and heated plug-in connectors are used, for example, in windscreen washer systems and in line systems for a urea solution, which is used as an $NO_x$ reduction additive for diesel engines with SCR catalytic converters.

A system for connecting hose lines of the type stated at the outset is known from DE 10 2005 050 867 A1, for example. The plug-in connector known from this publication has a housing, into which a plug is inserted, the plug containing a heating element and two contact elements, via which the heating element is connected to an electric power source. The heating element is used to heat only the section of the plug-in connector in which the housing is situated. In the publication mentioned, there is therefore also a proposal to provide the heating element with a heating lance, which projects into the tube of the plug-in connector and there directly heats the liquid passed through the plug-in connector. The provision of the heating lance enables the liquid to be heated up reliably. However, it is noted that the structure of the system known from DE 10 2005 050 867 A1 is complex. Moreover, the heating lance must be guided into the interior of the plug-in connector, starting from the heating element, and this may lead to problems with the tightness of the plug-in connector.

United States patent application publication 2010/0290764 likewise discloses a system for connecting hose lines. In the system known from this publication, the tube of the plug-in connector is wound with an electrically conductive wire, which serves as an electric heating element. Guide elements for the heating wire are provided on the surface of the tube of the plug-in connector. To provide mechanical protection for the heating wire, the plug-in connector can either be overmolded or provided with an encapsulation. With the system known from United States patent application publication 2010/0290764 for connecting hose lines, the plug-in connector can be heated over the entire length thereof, thereby reliably preventing the liquid that is passed through the plug-in connector from freezing. However, the system known from this publication is complex to produce for a number of reasons. Thus, for example, separate guide elements for the heating wire must be provided on the surface of the tube of the plug-in connector. Furthermore, the heating wire must be passed over the individual guide elements in tight coils, a complex procedure that is possible only with difficulty, if at all, in an automated process. Finally, it must be noted that there is a risk of damage to the system even during the production thereof. For example, the heating wire is passed over the guide elements with tight bending radii, and this may cause damage to the heating wire. In addition, the overmolding of the plug-in connector can also cause damage to the sensitive heating wire.

SUMMARY OF THE INVENTION

It is an object of the invention to provide a system for connecting hose lines that contains an electric heating element, by means of which the plug-in connector can be heated reliably and in an adequate way, and that can be mounted on the plug-in connector in a simple and fail-safe manner.

Starting from the system of the type stated at the outset, the above object is achieved by the fact that the electric heating element is embedded into a clamping ring with a gap, wherein the tube is pushed through the gap of the clamping ring in such a way that the clamping ring reaches around at least one section of the tube and bears against the tube.

At least in the section onto which the clamping ring is pushed, the tube preferably has a circular cross section and is designed as a cylindrical tube. The clear interior of the clamping ring is accordingly preferably likewise of circular design, enabling it to reach around the tube in an optimum manner. In this case, the outside diameter of the tube and the inside clear diameter of the clamping ring are preferably matched to one another in such a way that the clamping ring is clamped onto the tube. However, it is likewise possible for the tube and the clamping ring to have other geometric configurations than the ones mentioned above. However, it is important in implementing the invention that the clamping ring pushed onto the tube reaches around the latter and bears against the tube.

The advantage achieved by means of the invention can be regarded, in particular, as the fact that the electric heating element is embedded in the clamping ring which reaches around the plug-in connector, thus ensuring that the tube of the plug-in connector is heated over virtually the entire circumference thereof. Another advantage of the invention can be regarded as the fact that the clamping ring is manufactured independently of the plug-in connector and is only pushed onto the plug-in connector subsequently in a single method step. This enables the clamping ring to be manufactured in a way which ensures that the heating element in the clamping ring is not damaged during the production of the clamping ring. The separate manufacture of the clamping ring furthermore allows easy retrofitting of plug-in connectors which do not contain a heating element. For this purpose, a separately manufactured clamping ring is simply pushed subsequently over the tube of the plug-in connector and clamped on the tube. Finally, another advantage of the invention can be regarded as the fact that the mounting of the clamping ring and hence the mounting of the heating element on the plug-in connector can be carried out in an automated manner, by machine.

According to another embodiment, the heating element contains a first electric conductive track having a first electric connection and a second electric conductive track having a second electric connection, which each extend at a distance from one another in the circumferential direction of the clamping ring and which are connected electrically to one another by at least one electric heating resistor. The first and the second electric connection serve to connect the heating element to an electric power source. The advantage of this embodiment can be regarded as the fact that such a design of the electric heating element enables the clamping ring to be heated both over the entire circumference thereof and over the entire length thereof in a simple manner. Another advantage of this embodiment can be regarded as the fact that the heating resistors embedded into the clamping ring enable the heat output of the heating element to be adapted in a simple manner to the demands made on the heatable plug-in connector.

According to yet another embodiment, the two conductive tracks are situated at a distance from one another on an electrically insulating film and are connected to the latter. For example, the conductive tracks can be printed on the electrically insulating film. The advantage of this embodiment can be regarded as the fact that the film with the two conductive tracks is simple to handle during the manufacturing process for the clamping ring, and the two conductive tracks on the film are nevertheless well protected from damage during the manufacturing process.

According to a further embodiment, the electrically insulating film is introduced into a pot-shaped clamping ring, wherein the remaining cavity in the pot-shaped clamping ring is completely filled with an insulating potting material, and wherein the two conductive tracks project from the potting material. The advantage of this embodiment can be regarded as the fact that the film is completely surrounded by the potting material in the finished clamping ring, and damage to the film, the conductive tracks and the heating resistors is thus reliably prevented.

According to yet another embodiment, the two conductive tracks are designed as stampings, and each conductive track contains a locating element for each heating resistor. The advantage of this embodiment can be regarded as the fact that the two conductive tracks can first of all be produced in a simple manner from a single stamping made of electrically conductive material, the two conductive tracks initially being connected to one another by a bridge. Once the two conductive tracks are connected to one another by means of the at least one heating resistor, the bridge is removed.

In yet another embodiment, the heating element has a third electric connection, which is secured on the first conductive track, and has a fourth electric connection, which is secured on the second conductive track. The third and the fourth electric connection serve to connect the ends of a heating wire wound around a hose connected to the plug-in connector to a power source via the heating element. The advantage of this embodiment can thus be regarded as the fact that the heating wire of a hose can be connected to the heating element and to the power source in a simple manner.

In a further embodiment, the electric connections are of sleeve-shaped design for the purpose of receiving an electric pin contact. All four electric connections are preferably designed in this way. The advantage of this embodiment can be regarded as the fact that electric pin contacts can be pushed into the connections, these pin contacts being available as standard components and being simple to handle.

In yet another embodiment, all the component parts of the heating element (namely the conductive tracks, the heating resistors and the electric connections) are completely surrounded by a flowable plastic to form the clamping ring. In connection with the electric connections, the feature that the connections are completely surrounded by a flowable plastic should be understood to mean that the outer surfaces of the sleeve-shaped connections are surrounded by the flowable plastic, whereas the inner surfaces of the sleeve-shaped connections are free from the plastic, enabling them to be brought into electric contact with the pin contacts. The advantage of this embodiment can be regarded as the fact that the component parts of the heating element are well protected from mechanical influences and environmental influences (for example, moisture). Another advantage of the development can be regarded as the fact that the plastic sheath for the heating element for the production of the clamping ring can be produced by injection molding. The clamping ring with the heating element can thus be manufactured in a simple and economical manner in large numbers.

According to another embodiment, the plastic is an electric insulator. The advantage of this embodiment can be regarded as the fact that the electrically conductive component parts of the heating element do not need to be provided with an electrically insulating layer before being overmolded with the plastic material.

According to yet another embodiment, the system can be connected to electric components by means of pin contacts, which are pushed into the sleeve-shaped connections, wherein the pin contacts are each surrounded by an annular seal, which seals are dimensioned in such a way that they seal off the sleeve-shaped connections from the outside. The seal is preferably composed of silicone. The advantage of this embodiment can be regarded as the fact that the electric connections are encapsulated completely with respect to the outside and, in particular, that no moisture can penetrate as far as the pin contacts or the heating element.

According to a further embodiment, the clamping ring is elastically deformable. The advantage of this embodiment can be regarded as the fact that the clamping ring can be bent open to push it onto the tube, and returns to its original shape after being pushed on. This enables the gap in the clamping ring to be made narrow (the gap covering at most 10° to 60°, preferably no more than 15° to 30°, of the 360° of the clamping ring), ensuring that the tube is heated over almost the entire circumference thereof.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
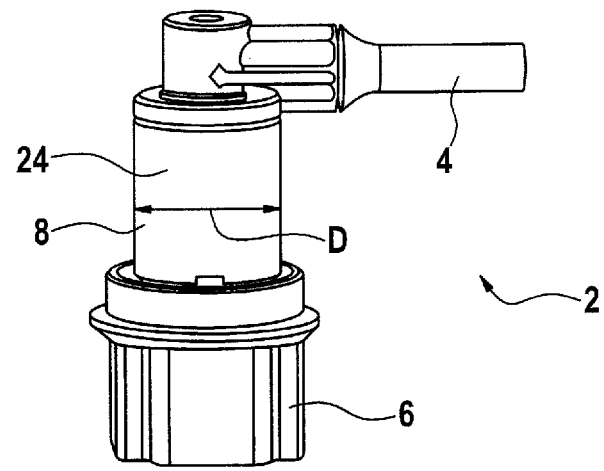
FIG. 1 shows a plug-in connector.

FIG. 1 shows a plug-in connector 2 having a first connection 4 and a second connection 6, which are connected to one another by a tube 8 and are arranged at right angles to one another. A hose line, through which a liquid is passed, is connected in a manner known per se to the first connection 4 in a line system. Another hose line of the line system or a unit (for example, a pump et cetera) or a liquid tank can be connected to the second connection 6. The tube 8, which connects the first connection 4 to the second connection 6, is designed as a cylindrical tube of circular cross section.

Figure 2:
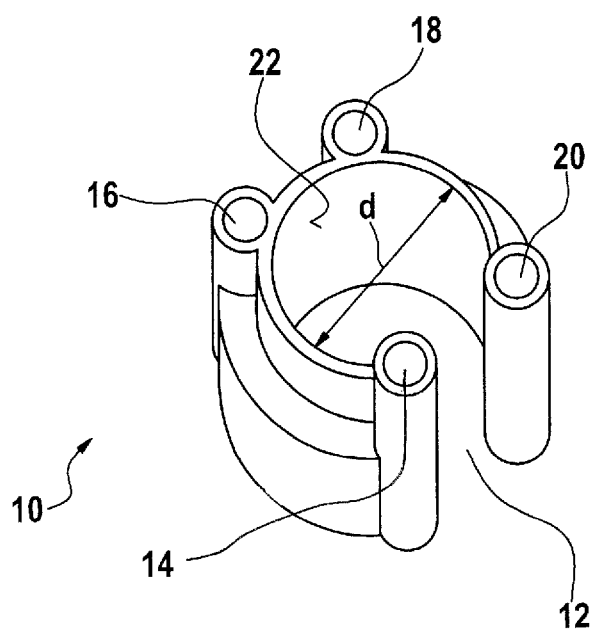
FIG. 2 shows a clamping ring.

FIG. 2 shows a clamping ring 10, into which an electric heating element is embedded. The clamping ring 10 has a gap 12 and four electric connections 14, 16, 18 and 20. The clear diameter (d) of the clamping ring 10 corresponds approximately to the outer diameter D of the tube 8 (see FIG. 1; 0.95 D≤d≤D).

Figure 3:
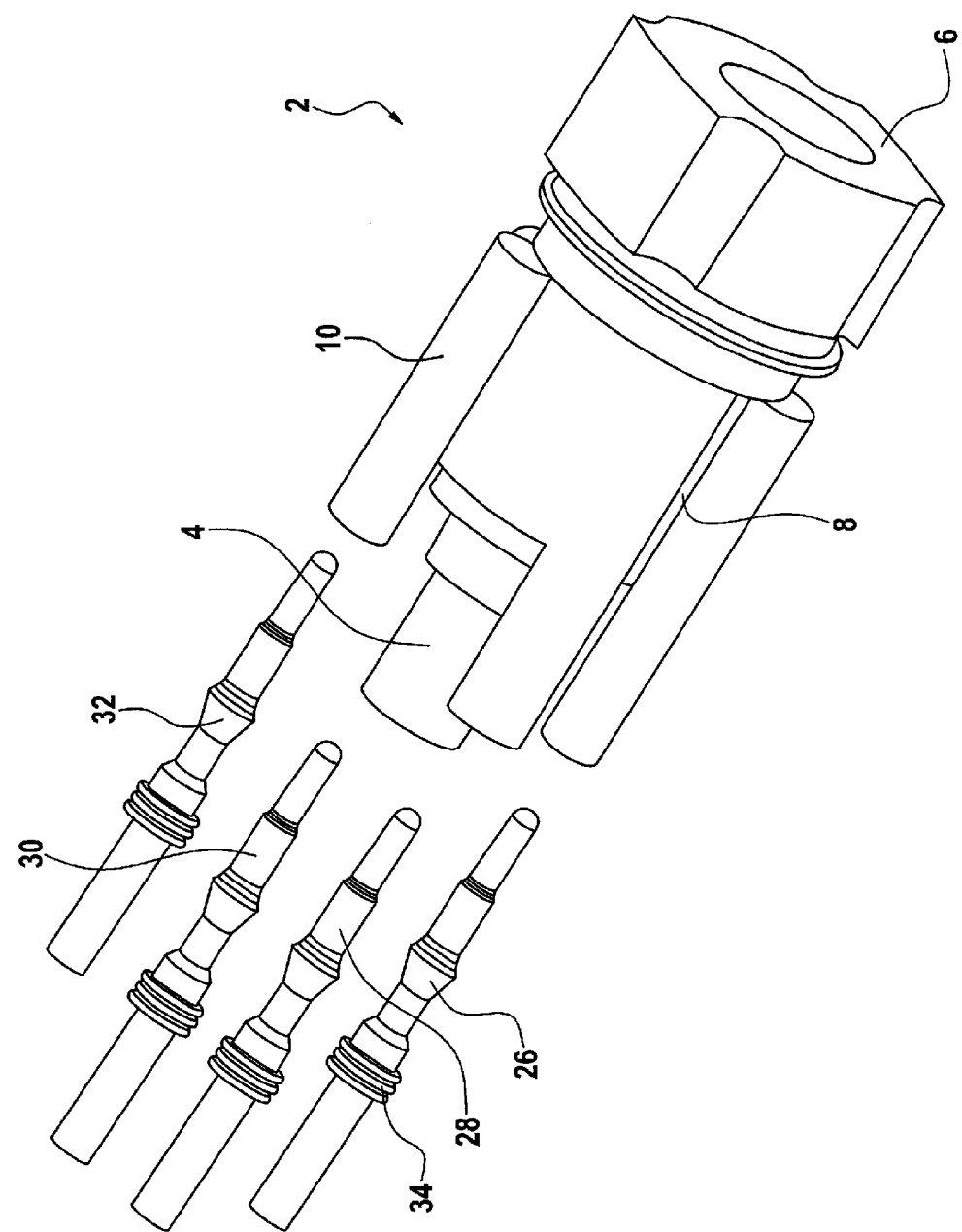
FIG. 3 shows a system for connecting hose lines.

FIG. 3 shows a system for connecting hose lines consisting of a plug-in connector 2 and a clamping ring 10, into which a heating element is embedded. In FIG. 3, the two connections (4, 6) are aligned in the longitudinal direction of the plug-in connector 2, which is defined by the longitudinal axis of the tube 8. The clamping ring 10 is pushed onto the tube 8, for which purpose the tube 8 is pushed through the gap 12 of the clamping ring 10. The clamping ring 10 is pushed onto the tube 8 and dimensioned in such a way that the gap 12 thereof extends in the longitudinal direction of the tube 8 and the clamping ring 10 reaches around the tube 8 almost completely in the circumferential direction (with the exception of the region of the gap 12) and reaches around it at least in sections in the longitudinal direction. The clamping ring 10 is preferably as long as the tube 8, ensuring that it reaches around the tube over the entire length, as shown in FIG. 3. Since the clear diameter (d) of the clamping ring 10 corresponds approximately to the diameter D of the tube 8, the inner surface 22 of the clamping ring 10 (see FIG. 2) bears on the outer surface 24 of the tube 8 (see FIG. 1) once the system is finished. This ensures good heat transfer between the clamping ring 10 with the embedded heating element and the tube 8 of the plug-in connector 2. By virtue of the dimensioning mentioned, the clamping ring 10 is furthermore securely clamped on the tube 8 and thus fixed securely in its position on the tube 8 without additional fastening elements.

Electric pin contacts 26, 28, 30 and 32 are pushed into the electric connections 14, 16, 18 and 20 (see also FIG. 2) in a line system. In this case, two of the electric pin contacts serve to connect the heating element embedded into the clamping ring 10 to a power source. For this purpose, the two other electric connections are connected to two further pin contacts, of which the first pin contact is connected to the first end of a heating wire and the second pin contact is connected to the second end of a heating wire. The heating wire is wound in order to heat the hose connected to the first connection 4 (not shown in FIG. 3). This has the effect that the electric heating wire of the hose is likewise connected to the power source via the heating element embedded into the clamping ring 10. Each pin contact 26, 28, 30 and 32 is provided with an annular silicone seal 34. This is arranged on the pin contact in such a way that it is accommodated by the respective sleeve-shaped electric connection 14, 16, 18 and 20 when the respective pin contact 26, 28, 30 and 32 is pushed completely into the latter. At the same time, the silicone seal is dimensioned in such a way that it bears against the inner wall of the sleeve-shaped electric connections 14, 16, 18 and 20 and seals off the latter from the outside.

Figure 4:
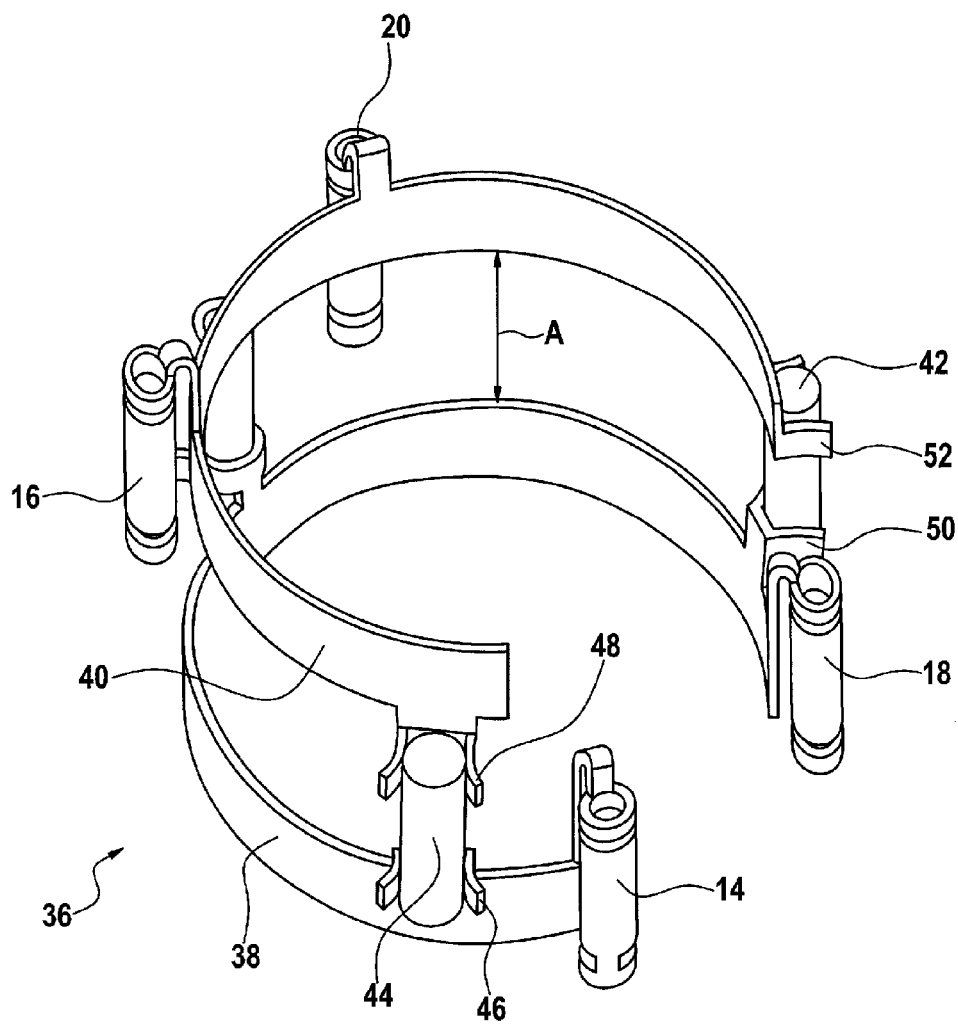
FIG. 4 shows a heating element.

FIG. 4 shows a heating element 36 in perspective. The heating element 36 has a first electric conductive track 38 having a first electric connection 14 and a second electric conductive track 40 having a second electric connection 16. The first electric conductive track 38 and the second electric conductive track 40 are arranged at a distance A from one another and are connected to one another in an electrically conductive manner by electric heating resistors 42 and 44. In this case, the distance A is chosen in such a way that the two conductive tracks assume a distance from one another in the finished clamping ring 10 which corresponds approximately to the length of the tube 8 of the plug-in connector 2 (see FIG. 1). Uniform heating of the tube over the entire length thereof is thereby ensured.

The two conductive tracks (38, 40) are designed as stampings and each contain receptacle elements 46, 48, 50 and 52 for the heating resistors (42, 44). The heating resistors (42, 44) are clipped into the receptacle elements 46, 48, 50 and 52. The conductive tracks (38, 40) can first of all be punched out of a single stamping, and are then still connected to one another by a bridge. The bridge is removed as soon as the conductive tracks (38, 40) are connected to one another by the heating resistors (42, 44).

In addition to the electric connections (14, 16) already mentioned, the first conductive track 38 comprises a third electric connection 18, and the second electric conductive track 40 comprises a fourth electric connection 20. The electric connections 14, 16, 18 and 20 are of sleeve-shaped design and are composed of metal. The pin contacts for the power source are attached to electric connections 14 and 16 in a finished line system (see also FIG. 3), and the pin contacts for the heating wire of the hose are attached to connections 18 and 20 (see also the description of FIG. 3).

The heating element 36 shown in FIG. 4 is completely surrounded by a flowable, electrically insulating plastic, giving rise to the clamping ring 10 shown in FIG. 2. This is preferably accomplished by injection molding, using an electrically insulating plastic. In this case, the heating element 36 lies in the finished clamping ring 10 in such a way that the electric conductive tracks 38 and 40 run in the circumferential direction of the clamping ring. The longitudinal axes of the heating resistors (42, 44) and of the sleeve-shaped electric connections 14, 16, 18 and 20 accordingly run parallel to the longitudinal axis of the clamping ring 10 (see also FIG. 2). Owing to the fact that the heating element 36 shown in FIG. 4 is elastically deformable, the finished clamping ring 10 is also elastically deformable and can simply be pushed over the tube 8 (see FIGS. 1 and 3) and clamped there.

Figure 5:
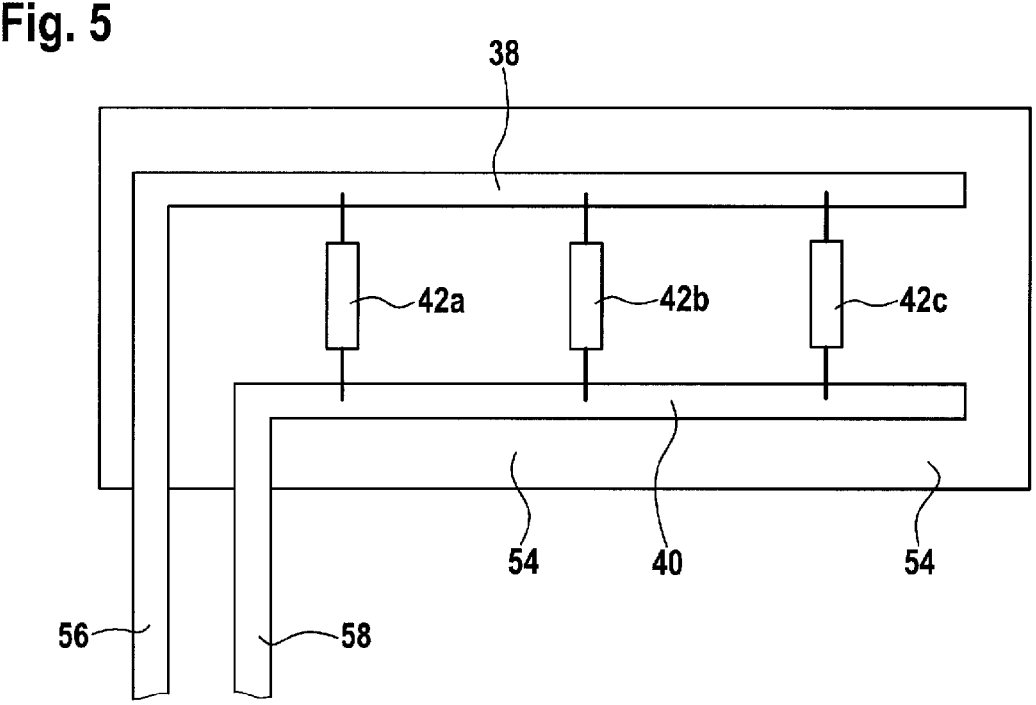
FIG. 5 shows a heating element; and,
FIG. 6 shows a clamping ring.

FIG. 5 shows another embodiment of a heating element 36. The heating element 36 contains an electrically insulating film 54, on which the first electric conductive track 38 and the second electric conductive track 40 are arranged. The conductive tracks (38, 40) are connected to one another by electric heating resistors $42a$ to $42c$. At one end, each conductive track (38, 40) bends at a right angle and is passed out in this direction via the film 54.

Figure 6:
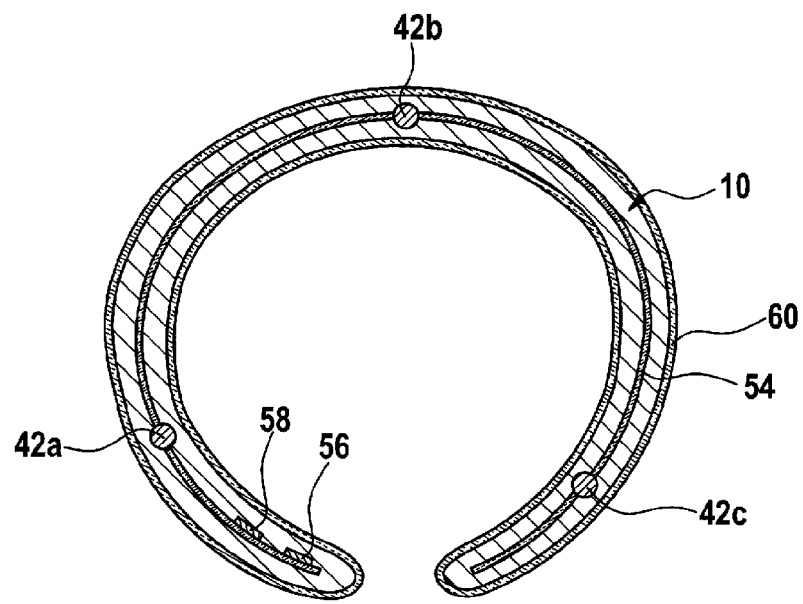

FIG. 6 shows a clamping ring 10, into which the electrically insulating film 54 is introduced. The clamping ring 10 is of pot-shaped design, and the film 54 is inserted into the pot of the clamping ring 10 in such a way that the conductive tracks (38, 40) (see FIG. 5) run in the circumferential direction of the clamping ring 10. The heating resistors $42a$, $42b$ and $42c$ are furthermore aligned in such a way that the longitudinal axes thereof run parallel to the longitudinal axis of the clamping ring 10. The two ends (56, 58) of the conductive tracks are oriented in such a way that they project from the plane of the paper. They are used to connect the two conductive tracks (38, 40) to a power source. Once the film 54 has been introduced into the pot of the clamping ring 10, the remaining cavity between the pot and the film is completely filled with an electrically insulating potting material 60. The clamping ring 10 shown in FIG. 6 is also elastically deformable, allowing it simply to be pushed over the tube 8 (see FIGS. 1 and 3) and clamped there.

It is understood that the foregoing description is that of the preferred embodiments of the invention and that various changes and modifications may be made thereto without departing from the spirit and scope of the invention as defined in the appended claims.

LIST OF REFERENCE SIGNS

Part of the Description 2 plug-in connector
4 first connection
6 second connection
8 tube
10 clamping ring
12 gap
14 electric connection
16 electric connection
18 electric connection
20 electric connection
22 inner surface
24 outer surface
26 electric pin contact
28 electric pin contact
30 electric pin contact
32 electric pin contact
34 sealing ring
36 heating element
38 electric conductive track
40 electric conductive track
42 heating resistor
44 heating resistor
46 receptacle element
48 receptacle element
50 receptacle element
52 receptacle element
54 film
56 end of a conductive track
58 end of a conductive track
60 potting material

What is claimed is:

1. A connector assembly for connecting a first hose line to a second hose line so as to permit a fluid to flow therethrough, the connector assembly comprising:

a first connector connected to said first hose line;
a second connector connected to said second hose line;
a tube interconnecting said first and second connectors to pass said fluid from said first hose line to said second hose line and said tube having a predetermined length;
a C-shaped clamp ring defining a longitudinal axis and defining a gap extending in the direction of said axis;
said C-shaped clamp ring being elastically deformable to facilitate pushing said tube laterally through said gap and to assume its original shape after being pushed onto said tube so as to engage around said tube and be seated thereon coaxially and in contact engagement therewith;
said C-shaped clamp ring having a length measured along said longitudinal axis thereof to correspond to said predetermined length of said tube ensuring that said C-shaped clamp ring reaches around said tube over said predetermined length thereof;
an electric heating resistor electrically connected into said C-shaped clamp ring to enable said C-shaped clamp ring to be heated both over substantially the entire circumference thereof and over substantially the entire length thereof so as to permit heat to be transferred from said C-shaped clamp ring to said tube over said predetermined length thereof and via said tube to said fluid thereby preventing said fluid from freezing at low ambient temperatures;
said C-shaped clamp ring being electrically conductive and configured to define an electric circuit for supplying electrical power to said electric heating resistor;
said tube having an outer surface and a diameter (D) and said clamp ring having an inner surface and a clear diameter (d) corresponding approximately to said diameter (D) so as to permit said inner surface of said clamp ring to bear tightly against said outer surface of said tube to facilitate the transfer of said heat from said C-shaped clamp ring to said tube while said C-shaped clamp ring simultaneously holds said clamp ring on said tube and supplies said electric power to said electric heating resistor;
said electric circuit containing a first electrically conductive track having a first electric connection and a second electrically conductive track having a second electric connection; said first and second electrically conductive tracks extend at a distance from one another in the circumferential direction said clamp ring; and, said electric heating resistor connects said first and second electrically conductive tracks to each other;
said first and second electrically conductive tracks being configured as stampings; and,
said electrically conductive tracks having respective receptacles for accommodating said electric heating resistor.

2. The connector assembly as claimed in claim 1, wherein said electrically conductive tracks are situated at a distance from one another on an electrically insulating foil and are connected to said electrically insulating foil.

3. The connector assembly as claimed in claim 2, wherein said clamp ring has a pot-shaped configuration; said electrically insulating foil is introduced into said pot-shaped clamp ring so as to leave a remaining cavity in said pot-shaped clamp ring; and, an insulating potting material completely fills said remaining cavity with said first and second electrically conductive tracks projecting from the insulating potting material.

4. A system for connecting hose lines comprising:
a plug-in connector having a first connector and a second connector;
a tube mutually connecting said first and second connectors;
an electric heating element for heating at least a section of said tube;
a clamp ring;
said heating element being embedded in said clamp ring;
said clamp ring defining a gap to facilitate pushing said tube therethrough so as to cause said clamp ring to engage around at least said section and be in contact engagement therewith;
said electric heating element containing a first electrically conductive track having a first electric connection and a second electrically conductive track having a second electric connection;
said first and second electrically conductive tracks extending at a distance from one another in the circumferential direction of said clamp ring;
at least one electric heating resistor connecting said first and second electrically conductive tracks to each other;
said first and second electrically conductive tracks being configured as stampings; and,
said electrically conductive tracks having respective receptacles for accommodating said heating resistor.

5. The system as claimed in claim 4, wherein said heating element further comprises a third electric connection attached to said first electrically conductive track; and, a fourth electric connection attached to said second electrically conductive track.

6. The system as claimed in claim 4, further comprising a plurality of electric pin contacts; and, said electric connections are each configured to be sleeve-shaped for receiving corresponding ones of said electric pin contacts.

7. The system as claimed in claim 6, wherein said electric pin contacts are pushed into corresponding ones of said sleeve-shaped electric connections; said system is connectable to electric components via said electric pin contacts; and, said pin contacts are each surrounded by an annular seal dimensioned so as to seal off the sleeve-shaped connections from the outside.

8. The system as claimed in claim 4, wherein all of the electrically conductive tracks, heating resistors and electric connections of said electric heating element are completely surrounded by a flowable plastic to form the clamp ring.

9. The system as claimed in claim 8, wherein the flowable plastic is an electric insulator.

10. A system for connecting hose lines comprising:
a plug-in connector having a first connector and a second connector;
a tube mutually connecting said first and second connectors;
an electric heating element for heating at least a section of said tube;
a clamp ring;
said heating element being embedded in said clamp ring;
said clamp ring defining a gap to facilitate pushing said tube therethrough so as to cause said clamp ring to engage around at least said section and be in contact engagement therewith;
said electric heating element containing a first electrically conductive track having a first electric connection and a second electrically conductive track having a second electric connection;
said first and second electrically conductive tracks extending at a distance from one another in the circumferential direction of said clamp ring;
said heating element further including a plurality of electric heating resistors connecting said first and second electrically conductive tracks to each other;
said first and second electrically conductive tracks being configured as stampings; and,
said electrically conductive tracks having respective receptacles for accommodating said plurality of electric heating resistors.

11. The system as claimed in claim 10, wherein said clamp ring defines a longitudinal axis; and, said electrically conductive tracks are situated at a distance (A) from one another in the direction of said longitudinal axis on an electrically insulating foil and are connected to said electrically insulating foil.

12. The system as claimed in claim 11, wherein said clamp ring has a pot-shaped configuration; said electrically insulating foil is introduced into said pot-shaped clamp ring so as to leave a remaining cavity in said pot-shaped clamp ring; and, an insulating potting material completely fills said remaining cavity with said first and second electrically conductive tracks projecting from the insulating potting material.

13. The system as claimed in claim 10, wherein said heating element further comprises a third electric connection attached to said first electrically conductive track; and, a fourth electric connection attached to said second electrically conductive track.

14. The system as claimed in claim 13, further comprising a plurality of electric pin contacts; and, said electric connections are each configured to be sleeve-shaped for receiving corresponding ones of said electric pin contacts.

15. The system as claimed in claim 14, wherein said electric pin contacts are pushed into corresponding ones of said sleeve-shaped electric connections; said system is connectable to electric components via said electric pin contacts; and, said pin contacts are each surrounded by an annular seal dimensioned so as to seal off the sleeve-shaped connections from the outside.

16. The system as claimed in claim 10, wherein all of the electrically conductive tracks, heating resistors and electric connections of said electric heating element are completely surrounded by a flowable plastic to form the clamp ring with said electrical connections projecting out of said plastic.

17. The system as claimed in claim 16, wherein the flowable plastic is an electric insulator.

18. The system as claimed in claim 10, wherein said clamp ring is elastically deformable.

\* \* \* \* \*